United States Patent
Rajurkar et al.

(10) Patent No.: US 8,570,951 B1
(45) Date of Patent: Oct. 29, 2013

(54) APPARATUS AND METHOD FOR IMPROVED TUNE-AWAY OPERATIONS IN (C+G) DSDS DEVICES

(71) Applicant: QUALCOMM Incorporated, San Diego, CA (US)

(72) Inventors: Anand Rajurkar, Hyderabad (IN); Parthasarathy Krishnamoorthy, Hyderabad (IN); Rashid Ahmed Akbar Attar, San Diego, CA (US); Priyangshu Ghosh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/935,295

(22) Filed: Jul. 3, 2013

(51) Int. Cl.
*H04W 4/00* (2009.01)

(52) U.S. Cl.
USPC ......................................... 370/328

(58) Field of Classification Search
USPC ............... 370/328–350, 458, 503, 508, 522; 455/422.1, 426.1, 426.2, 445
See application file for complete search history.

(56) References Cited

U.S. PATENT DOCUMENTS

| 7,848,305 | B2 | 12/2010 | Joshi et al. | |
| 8,155,652 | B2* | 4/2012 | Parekh et al. | 455/436 |
| 2009/0131054 | A1* | 5/2009 | Zhang | 455/436 |
| 2009/0279517 | A1 | 11/2009 | Chin et al. | |
| 2012/0190362 | A1* | 7/2012 | Subbarayudu et al. | 455/435.1 |
| 2012/0270545 | A1* | 10/2012 | Zhao et al. | 455/435.1 |
| 2012/0294173 | A1 | 11/2012 | Su et al. | |
| 2013/0023275 | A1* | 1/2013 | Mutya et al. | 455/452.1 |

FOREIGN PATENT DOCUMENTS

WO 2012140023 A1 10/2012

* cited by examiner

*Primary Examiner* — Frank Duong
(74) *Attorney, Agent, or Firm* — QUALCOMM IP Department; James Hunt Yancey, Jr.

(57) ABSTRACT

Apparatus and methods are disclosed for establishing a call utilizing a traffic channel corresponding to a first communication protocol; transmitting a data rate control (DRC) channel comprising a null cover for no greater than 16 time slots; tuning away from the call to receive signaling corresponding to a second communication protocol; and following the receiving of the signaling corresponding to the second communication protocol, tuning back to the traffic channel to resume the call.

29 Claims, 8 Drawing Sheets

APPARATUS AND METHOD FOR IMPROVED TUNE-AWAY OPERATIONS IN (C+G) DSDS DEVICES

TECHNICAL FIELD

The following relates generally to wireless communication, and more specifically, to receivers for use in a wireless communication system.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power).

A subscriber identity module (SIM) is an integrated circuit, or in some cases, an application that runs on a universal integrated circuit card (UICC), used on a mobile device such as a mobile phone or a computer to store the international mobile subscriber identity (IMSI) and the related key used to identify and authenticate subscribers on mobile devices. A dual SIM mobile phone is one which holds two SIM cards (or runs two SIM applications), and allows the use of two services or subscriptions on a single mobile device. Mobile devices having dual SIM capability allow both SIMS to be active simultaneously and allow calls to be received on either number at any given time. Dual SIM Dual Standby (DSDS) is a technology that operates both SIMS simultaneously but shares only one transceiver between them.

As the demand for mobile broadband access continues to increase, research and development continue to advance the technology not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communication between a mobile device and a telecommunications network. Here, the method includes establishing a call utilizing a traffic channel corresponding to a first communication protocol, transmitting a data rate control (DRC) channel including a null cover for a duration corresponding to a number of packet slots corresponding to reception of a single packet, tuning away from the call to receive signaling corresponding to a second communication protocol, and following the receiving of the signaling corresponding to the second communication protocol, tuning back to the traffic channel to resume the call.

Another aspect of the disclosure provides an apparatus configured for wireless communication, including at least one processor, a memory coupled to the at least one processor, and a communication interface coupled to the at least one processor. Here, the at least one processor is configured to establish a call utilizing a traffic channel corresponding to a first communication protocol, to transmit a data rate control (DRC) channel comprising a null cover for a duration corresponding to a number of packet slots corresponding to reception of a single packet, to tune away from the call to receive signaling corresponding to a second communication protocol, and following the receiving of the signaling corresponding to the second communication protocol, to tune back to the traffic channel to resume the call.

An apparatus configured for wireless communication, including means for establishing a call utilizing a traffic channel corresponding to a first communication protocol, means for transmitting a data rate control (DRC) channel comprising a null cover for a duration corresponding to a number of packet slots corresponding to reception of a single packet, means for tuning away from the call to receive signaling corresponding to a second communication protocol, and means for, following the receiving of the signaling corresponding to the second communication protocol, tuning back to the traffic channel to resume the call.

Another aspect of the disclosure provides a non-transitory computer storage medium, containing instructions which, when executed by a computer, configure a mobile device for wireless communication with a base station, by establishing a call utilizing a traffic channel corresponding to a first communication protocol, transmitting a data rate control (DRC) channel comprising a null cover for a duration corresponding to a number of packet slots corresponding to reception of a single packet, tuning away from the call to receive signaling corresponding to a second communication protocol, and, following the receiving of the signaling corresponding to the second communication protocol, tuning back to the traffic channel to resume the call.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the discussions are described below for CDMA and 3rd Generation Partnership Project 2 (3GPP2) 1x protocols and systems, and related terminology may be found in much of the following description. However, those of ordinary skill in the art will recognize that one or more aspects of the present disclosure may be employed and included in one or more other wireless communication protocols and systems.

Figure 1:
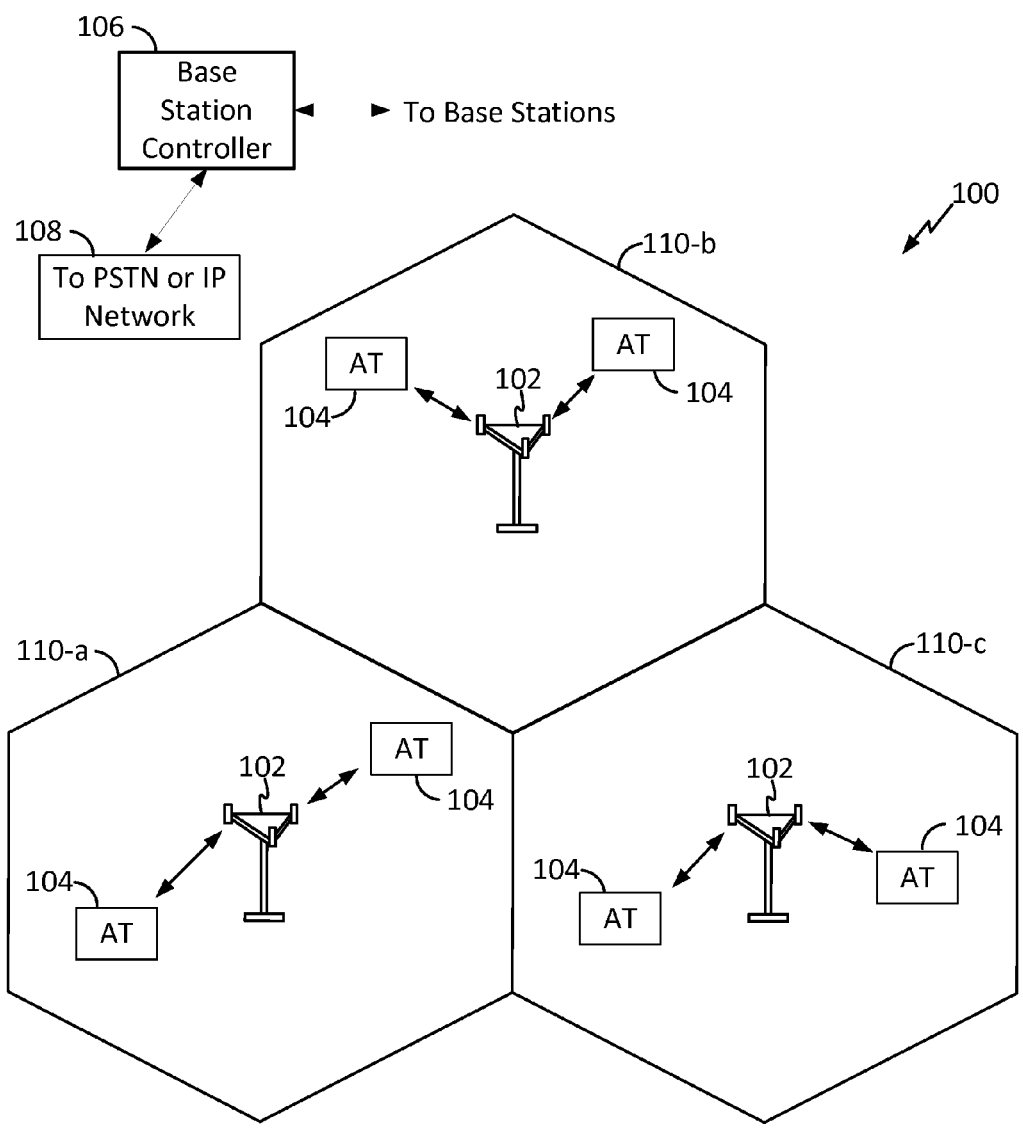
FIG. 1 is a block diagram illustrating an example of a network environment in which one or more aspects of the present disclosure may find application.

FIG. 1 is a block diagram illustrating an example of a network environment in which one or more aspects of the present disclosure may find application. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the mobile devices referred to herein as access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106 via multiple carriers. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In a coverage area 110 that is divided into sectors, the multiple sectors within a coverage area 110 can be formed by groups of antennas with each antenna responsible for communication with one or more access terminals 104 in a portion of the cell.

One or more access terminals 104 may be dispersed throughout the coverage areas 110, and may wirelessly communicate with one or more sectors associated with each respective base station 102. An access terminal 104 may generally include one or more devices that communicate with one or more other devices through wireless signals. Such access terminals 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. The access terminals 104 may include mobile terminals and/or at least substantially fixed terminals. Examples of access terminals 104 include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, and/or other communication/computing devices which communicate, at least partially, through a wireless or cellular network.

Figure 2:
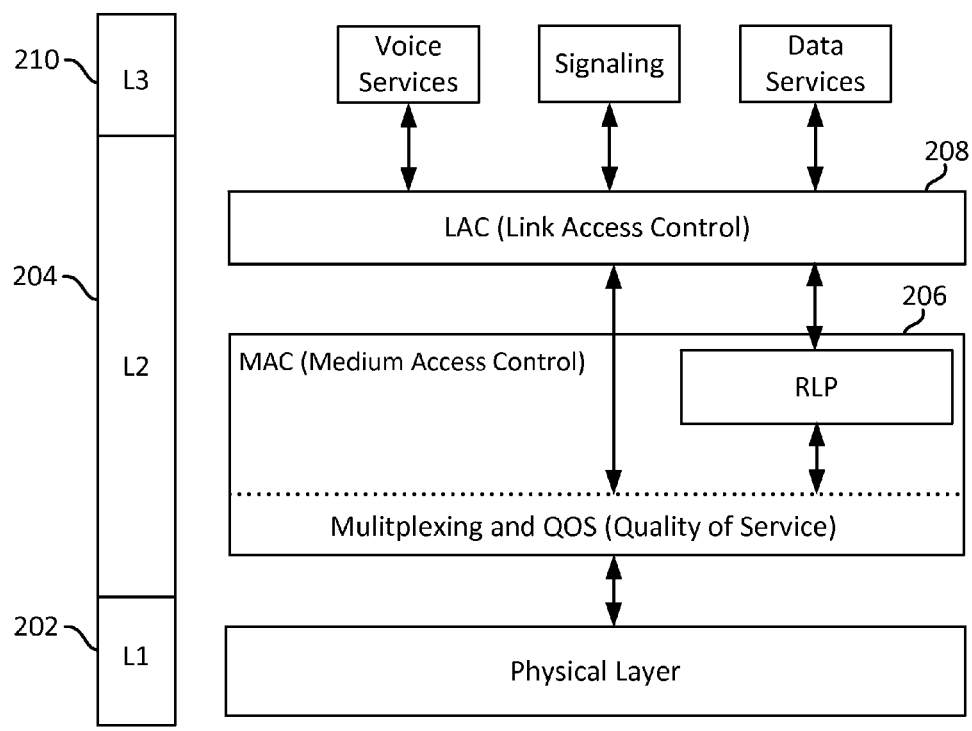
FIG. 2 is a block diagram illustrating an example of a protocol stack architecture which may be implemented by an access terminal.

The access terminal 104 may be adapted to employ a protocol stack architecture for communicating data between the access terminal 104 and one or more network nodes of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 2 is a block diagram illustrating an example of a protocol stack architecture which may be implemented by an access terminal 104. Referring to FIGS. 1 and 2, the protocol stack architecture for the access terminal 104 is shown to generally include three layers: Layer 1 (L1), Layer 2 (L2), and Layer 3 (L3).

Layer 1 202 is the lowest layer and implements various physical layer signal processing functions. Layer 1 202 is also referred to herein as the physical layer 202. This physical layer 202 provides for the transmission and reception of radio signals between the access terminal 104 and a base station 102.

The data link layer, called layer 2 (or "the L2 layer") 204 is above the physical layer 202 and is responsible for delivery of signaling messages generated by Layer 3. The L2 layer 204 makes use of the services provided by the physical layer 202. The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the layer 3. The LAC sublayer makes use of the services provided by the lower layers (e.g., layer 1 and the MAC sublayer).

Layer 3 210, which may also be referred to as the upper layer or the L3 layer, originates and terminates signaling messages according to the semantics and timing of the communication protocol between a base station 102 and the access terminal 104. The L3 layer 210 makes use of the services provided by the L2 layer. Information (both data and voice) message are also passed through the L3 layer 210.

One or more aspects of the present disclosure relate to dual-SIM dual-standby (DSDS) devices, in particular, those devices configured to utilize Evolution Data Optimized (EVDO) protocols for high-speed communication.

A DSDS device, while engaged in EVDO traffic, may perform tune-away operations, e.g., tuning to another subscription channel (e.g., a GSM channel or a 1x channel) for every page cycle. While performing these tune-aways, the receive chain engaged in EVDO traffic follows a so-called DRC ramp down procedure, during which no communication activity occurs, leading to throughput degradation for the EVDO traffic.

That is, as specified for EVDO traffic, the access terminal 104 transmits a data rate control (DRC) channel configured to specify a requested transmission rate. The DRC channel transmission utilizes a suitable cover code, called a DRC cover, which may be either a sector cover or a null cover. In general, DRC covers are associated with a particular sector in the access terminal's Active Set (called a "sector cover"). Here, if the access terminal 104 utilizes the DRC cover associated with a particular sector, the access terminal is said to be pointing the DRC at that particular sector. On the other hand, a null cover, not associated with any particular sector, may be utilized to inhibit transmission of data from the access network.

When a DSDS access terminal is engaged in a call utilizing an EVDO traffic channel, the access terminal 104 first transmits the DRC channel utilizing the null cover for a specified number of slots prior to tuning away to another protocol (e.g., GSM, IS-2000 1X, or any other suitable protocol). This transmission is sometimes referred to as the "DRC ramp down" procedure. According to conventional procedures, the number of slots to utilize for the transmission of the DRC channel utilizing the null cover is as follows:

(No. of slots of Current DRC Requested)*4+(DRC length in slots)

Generally, access terminals are implemented assuming the worst case conditions. That is, the length of the null cover transmission is generally configured to extend for the length of time of an in-flight packet from the base station to the access terminal. At the lowest data rate, corresponding to DRC-1, the access terminal needs 16 packet slots to fully receive such a packet. This number is multiplied by the interlacing factor 4, as indicated in the equation above, resulting in the transmission of the DRC channel utilizing the null cover for at least 64 slots. However, such poor radio channel conditions are not the case most of the time. During other, better conditions, wherein the access terminal is likely to receive a packet in its first transmission, a shorter transmission of the DRC channel with the null cover would be effective. Nevertheless, in a conventional access terminal, the 64-slot transmission is still utilized in all cases, crowding out time slots that might otherwise be utilized for EVDO traffic.

In particular, because C+G DSDS access terminals as currently implemented may engage in back-to-back GSM and 1X tune-aways during EVDO traffic, this transmission of the DRC channel with the null cover for the full 64-slot duration can cause a substantial effect to the throughput on the EVDO traffic channel.

Figure 3:
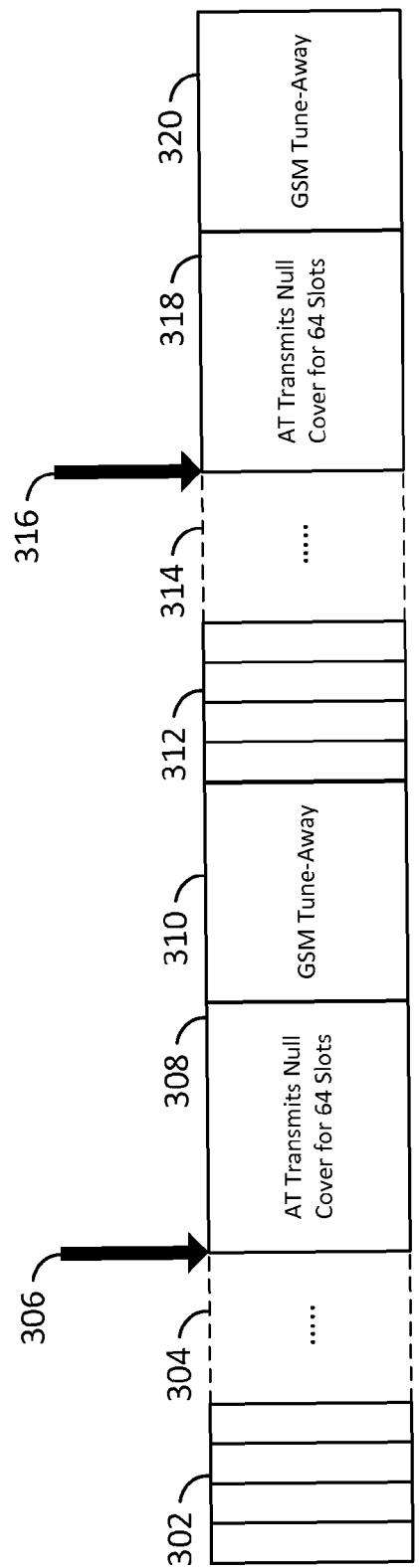
FIG. 3 is a timing diagram schematically illustrating a tune-away operation from EVDO traffic to perform GSM operations in accordance with the prior art.

For example, referring now to FIG. 3, there is shown a timing diagram that illustrates some of the operations as they may take place in a conventional implementation of a DSDS device (e.g., an access terminal) that periodically tunes away from EVDO traffic to perform GSM operations. Beginning at 302, the access terminal may transmit a data rate request on the DRC channel corresponding to DRC-1 (indicating a requested rate of 38.4 kbps). After a period of time (reference numeral 304) where a base station is serving the access terminal, in accordance with a scheduled GSM tune-away operation 310, at 306, the access terminal may begin a DRC ramp down procedure. That is, as described above, during an EVDO traffic call, prior to tuning away to listen for incoming messages on the GSM channel, the access terminal transmits the DRC channel utilizing a null cover for 64 time slots (indicated at 308), thereby inhibiting the base station from serving EVDO traffic to the access terminal. At step 310, a GSM tune-away occurs, wherein the access terminal undertakes any suitable communication activity utilizing the GSM channels, such as listening for incoming page messages addressed to the access terminal from the GSM network.

At reference numeral 312, in order to resume the EVDO traffic call, the access terminal again transmits a data rate request on the DRC channel, in this example, again corresponding to DRC-1. Thus, at 314, the base station serves access terminal with EVDO traffic for a period of time. At 316, the access terminal again begins a 64-slot DRC ramp down procedure, and again, during period 318, the base station is not serving the access terminal during the 64 time slots that the access terminal transmits the null cover; and at 320, the access terminal undertakes a GSM tune-away.

As indicated above, although several scenarios (such as the one illustrated, under DRC-1) would suffice with a shorter DRC ramp down procedure, the conventional access terminal always assumes worst-case conditions and accordingly transmits the DRC channel with the null cover for the full 64 slots (e.g., as seen at 308 and 318). This long and sometimes unnecessary action can result in throughput degradation for the EVDO traffic at 304 and 314, which terminates earlier than it would if the DRC ramp down procedure were shortened.

Therefore, in accordance with an aspect of the present disclosure, the DRC ramp down procedure, wherein the DRC channel is transmitted with the null cover, may be shortened so that the EVDO traffic can extend for a longer duration prior to a tune-away, resulting in increased throughput. For example, rather than extending the transmission of the null cover in all cases to account for the worst-case scenario (as described above, 64 time slots or more to account for transmission of the slowest DRC-1 data rate packet, plus the DRC length), the null cover may be transmitted for a duration corresponding to the reception of a single packet. In some cases, this duration may last for no greater than 16 time slots, to account for a single packet being received at DRC-1. In other cases, this duration may last for an even lesser number of slots, to account for a single packet being received at a higher DRC. As an illustrative example, at DRC-12, wherein a data rate of 2457.6 Kbps is utilized on the forward link, a single (1) packet slot is the extent of the duration needed for the access terminal to receive a single packet. Thus, in this example, a transmission of a null cover for a single (1) slot may be utilized prior to a tune-away operation to inhibit the forward link transmission of the EVDO traffic.

In a further aspect of the disclosure, the transmission of the DRC channel utilizing the null cover (i.e., the DRC ramp down operation) may be dynamically determined in accordance with the current DRC selected for the ongoing EVDO traffic call. In this way, at each tune-away operation wherein an EVDO traffic call is interrupted, the duration of the transmission of the null cover may be determined dynamically according to the current DRC.

Figure 4:
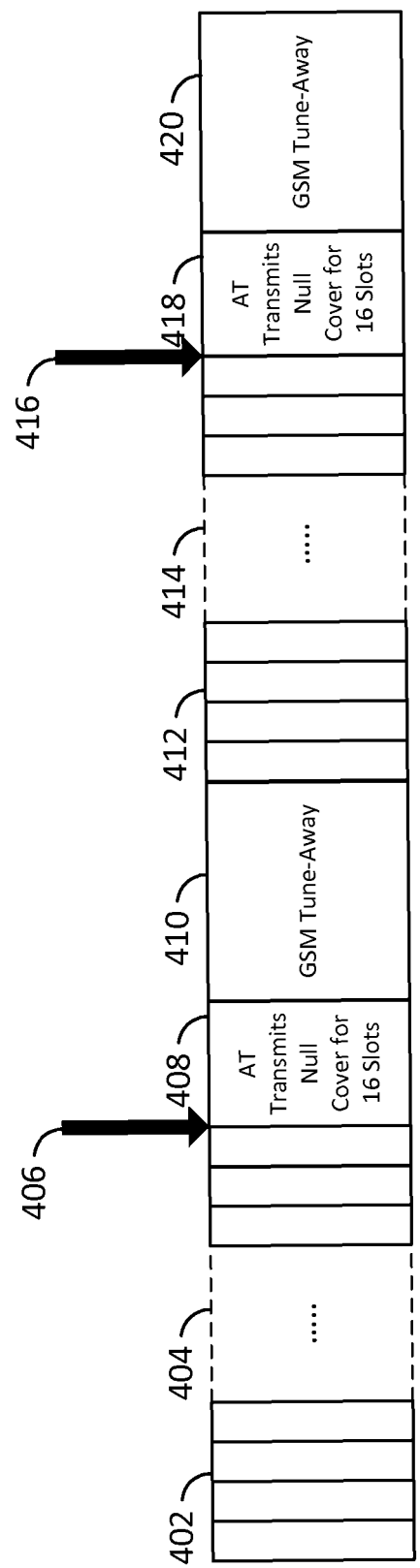
FIG. 4 is a timing diagram schematically illustrating a tune-away operation from EVDO traffic to perform GSM operations in accordance with an aspect of the present disclosure.

Referring now to FIG. 4, there is shown a timing diagram that illustrates some of the operations as they may take place in a DSDS device configured in accordance with an aspect of the disclosure (e.g., the access terminal 104).

Beginning at 402, the access terminal 104 may transmit a data rate request on the DRC channel corresponding to DRC-1 (indicating a requested rate of 38.4 kbps). After a period of time (reference numerals 404, 405) where a base station 102 is serving the access terminal 104, in accordance with a scheduled GSM tune-away operation, at 406, a DRC ramp down procedure. That is, as described above, during an EVDO traffic call, prior to tuning away to listen for incoming messages on the GSM channel, the access terminal transmits the DRC channel utilizing a null cover. However, in accordance with an aspect of the disclosure, this DRC transmission with a null cover lasts, for example, for only 16 slots rather than the 64 slots shown in FIG. 3. Of course, in other examples, as described above, the DRC transmission with the null cover may have a different duration, e.g., corresponding to a number of time slots needed for the reception of a single packet at the current forward link data rate. Accordingly, in an aspect of the disclosure, the EVDO traffic period 404 may be extended, as seen at period 405, enabling increased throughput for the EVDO traffic, by allowing base station 102 and access terminal 104 to communicate for a greater duration.

At step 410, a GSM tune-away occurs, wherein the access terminal 104 undertakes any suitable communication activity utilizing the GSM channels, such as listening for incoming page messages addressed to the access terminal from the GSM network. At reference numeral 412, in order to resume the EVDO traffic call, the access terminal 104 again transmits a data rate request on the DRC channel, in this example, again corresponding to DRC-1. At step 416, the access terminal 104 again begins a DRC ramp down procedure (e.g., having a duration corresponding to a number of time slots needed for the reception of a single packet at the current forward link data rate), and again, during period 418, the base station 102 is not serving the access terminal 104 during the 16 time slots that the access terminal 104 transmits the null cover; and at 420, the access terminal 104 undertakes a GSM tune-away.

In both processes described above in relation to FIGS. 3 and 4, a tune-away to GSM channels has been described. However, this is merely one example, and any tune-away operation from an EVDO traffic call, wherein the DRC ramp down procedure as described above, with a transmission of the DRC channel utilizing a null cover, may fall within the scope of the present disclosure.

In a further aspect of the disclosure, the DSDS access terminal 104 may be a C+G DSDS device, where C+G indicates that the device provides communication capabilities for subscriptions in both CDMA (IS-2000 1X) and GSM services. In particular, a C+G DSDS device may be capable of tuning away from an ongoing EVDO traffic call to, for example, listen for incoming page messages on each of the 1X and the GSM subscriptions, while returning to the EVDO traffic call when those tune away operations are complete.

However, as described below in relation to FIG. 5, if the time between GSM and 1X pages is less than a certain threshold time Ts, a great degradation in throughput for the EVDO traffic call may occur.

Figure 5:
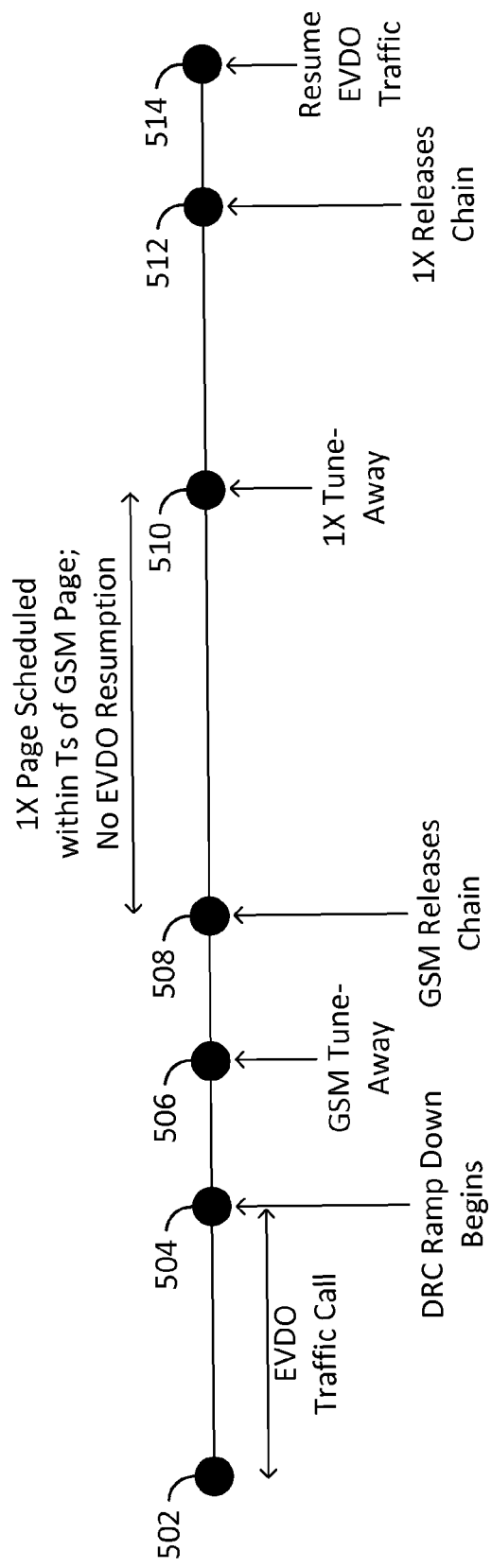
FIG. 5 is a timing diagram schematically illustrating a C+G DSDS tune-away operation from EVDO traffic to perform both GSM and 1X operations in accordance with the prior art.

Referring now to FIG. 5, there is shown a timing diagram that illustrates some of the operations as they may take place in a conventional implementation of a C+G DSDS device (e.g., an access terminal) that periodically tunes away from EVDO traffic to perform GSM operations, as well as to perform 1X operations. Beginning at 502, the access terminal establishes a call utilizing an EVDO traffic channel, and accordingly, the access terminal engages in EVDO traffic for a period of time. At 504, in accordance with a scheduled GSM tune-away operation 506, a DRC ramp down procedure begins. That is, as described above, the access terminal transmits the DRC channel utilizing a null cover for 64 time slots (recall that this figure illustrates a conventional device). At 506, a GSM tune-away occurs, wherein the access terminal undertakes any suitable communication activity utilizing the GSM channels, such as listening for incoming page messages addressed to the access terminal from the GSM network.

At 508, the GSM functionality at the access terminal releases control of the transceiver chain. At this point, however, the access terminal is aware that the 1X functionality at the access terminal is scheduled to perform a tune-away 510 to perform a communication activity utilizing the 1X channels, such as listening for incoming page messages addressed to the access terminal from the 1X network. However, as indicated above, the time between the release of the transceiver chain by the GSM functionality at 508, and the 1X tune-away scheduled at 510 is less than a certain threshold time Ts.

In this case, because the 1X tune-away is scheduled so soon after the GSM tune-away, due in part to the known length of the DRC ramp down procedure (i.e., 64 time slots), the access terminal may determine that time is insufficient to resume the EVDO traffic call. Therefore, between 508 and 510, the access terminal may remain essentially idle, not resuming the EVDO traffic call, while it waits for the scheduled 1X traffic activity at 510. This idle time can result in significant throughput degradation for the EVDO traffic.

That is, in order to resume the EVDO traffic call, a certain minimum amount of time is generally required. Here, this amount of time includes the sum of the time taken by the access terminal to tune its RF circuitry from another radio access technology back to the EVDO channel; a sufficient amount of time to perform a meaningful data transfer; and the time needed for the DRC ramp down procedure, combined with the 4 slot DRC length.

Here, the RF tune time may vary according to the hardware in a particular access terminal. In one example, the RF tune time may be approximately 24 ms.

A sufficient amount of time to perform a meaningful data transfer is something of a subjective quantity, and may vary from person to person based on their perception. In one example, this time may be approximately 8 ms.

Finally, as described above, the conventional DRC ramp down procedure lasts for a duration of 64 slots. This time, added with the 4-slot DRC length, at approximately 1.667 ms per time slot, results in approximately 113 ms.

Thus, utilizing these exemplary parameters, one example of a value for the variable Ts may be 24 ms+8 ms+113 ms, or approximately 145 ms. That is, referring again to FIG. 5, if the time between the end 508 of the GSM communication operation, and the beginning 510 of the 1X communication operation is less than approximately 145 ms, than insufficient time exists to resume the EVDO traffic call, and as described above, the access terminal may remain essentially idle during this time, resulting in throughput degradation for the EVDO traffic.

Again, this 113 ms time for Ts is merely exemplary in nature, and the actual threshold time below which insufficient time exists to resume the EVDO traffic call may vary as described above, e.g., in accordance with the particularities of the RF circuitry at the access terminal, and/or the amount of data that may be perceived as a meaningful amount of data.

At 512, the 1X functionality of the access terminal releases the transceiver chain. Finally, at 514, the access terminal resumes the EVDO traffic call by again giving control of the transceiver chain to the EVDO traffic.

Figure 6:
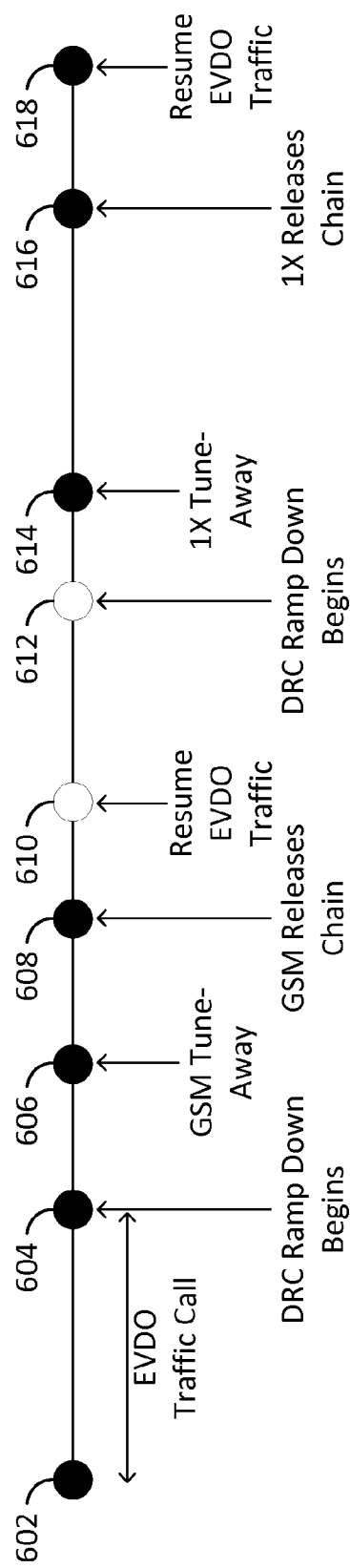
FIG. 6 is a timing diagram schematically illustrating a C+G DSDS tune-away operation from EVDO traffic to perform both GSM and 1X operations in accordance with an aspect of the present disclosure.

FIG. 6 is a timing diagram that illustrates some of the operations as they may take place in a C+G DSDS device (e.g., the access terminal 104) configured in accordance with an aspect of the present disclosure. That is, as described further below, while the timing of the GSM tune-away and the 1X tune-away are the same as those in FIG. 5, here, by virtue of the DRC ramp down procedure being reduced to a duration corresponding to the number of time slots needed for the reception of a single packet at the current forward link data rate, the access terminal 104 is enabled to resume the EVDO traffic call in between these tune-aways, resulting in increased throughput for the EVDO traffic.

That is, at 602, the access terminal 104 establishes a call utilizing an EVDO traffic channel, and accordingly, the access terminal 104 engages in EVDO traffic for a period of time. At 604, in accordance with a scheduled GSM tune-away operation 606, the DRC ramp down procedure begins. That is, as described above, the access terminal transmits the DRC channel utilizing a null cover, however, in accordance with an aspect of the present disclosure, this transmission is for a duration corresponding to a number of time slots needed for the reception of a single packet at the current forward link data rate (e.g., no greater than 16 time slots). At 606, a GSM tune-away occurs, wherein the access terminal undertakes any suitable communication activity utilizing the GSM channels, such as listening for incoming page messages addressed to the access terminal from the GSM network.

At 608, the GSM functionality at the access terminal releases control of the transceiver chain. Here, as in the example described above in relation to FIG. 5, the access terminal 104 is aware that the 1X functionality at the access terminal 104 is scheduled to perform a tune-away operation 614 to perform a communication activity utilizing the 1X channels, such as listening for incoming page messages addressed to the access terminal from the 1X network. However, in this example, by virtue of the DRC ramp down procedure having a relatively short duration as described above in relation to step 604, there is sufficient time to resume the EVDO traffic call.

That is, while the RF tune time and the amount of time to perform a "meaningful" data transfer are essentially the same as in the example described above in relation to FIG. 5, here, the DRC ramp down procedure is no greater than 16 time slots. Thus, this time, in addition the 4-slot DRC length, is approximately 32 ms. Therefore, here, the EVDO traffic call may be resumed even in the case that the time between the end 608 of the GSM communication operation and the beginning 614 of the 1X communication operation is less than Ts (e.g., approximately 113 ms). In this example, utilizing the exemplary numbers given above, the EVDO traffic call may be resumed even when the time between the end 608 of the GSM communication operation and the beginning 614 of the 1X communication operation is greater than approximately 24 ms+8 ms+32 ms, or approximately 64 ms.

Therefore, at 610, the access terminal 104 resumes the EVDO traffic call by giving control of the transceiver chain to the EVDO traffic for a period of time. At 612, in accordance with a scheduled 1X tune-away operation 616, a DRC ramp down procedure begins. That is, as described above, the access terminal 104 transmits the DRC channel utilizing a null cover for no greater than 16 time slots. At 614, a 1X tune-away occurs, wherein the access terminal 104 undertakes any suitable communication activity utilizing the 1X channels, such as listening for incoming page messages addressed to the access terminal from the 1X network.

At 616, the 1X functionality of the access terminal 104 releases the transceiver chain. Finally, at 618, the access terminal 104 resumes the EVDO traffic call by again giving control of the transceiver chain to the EVDO traffic.

In both processes described above in relation to FIGS. 5 and 6, a tune-away to GSM and 1X channels has been described. However, this is merely one example, and any tune-away operation from an EVDO traffic call, wherein the DRC ramp down procedure as described above, with a transmission of the DRC channel utilizing a null cover, may fall within the scope of the present disclosure.

Figure 7:
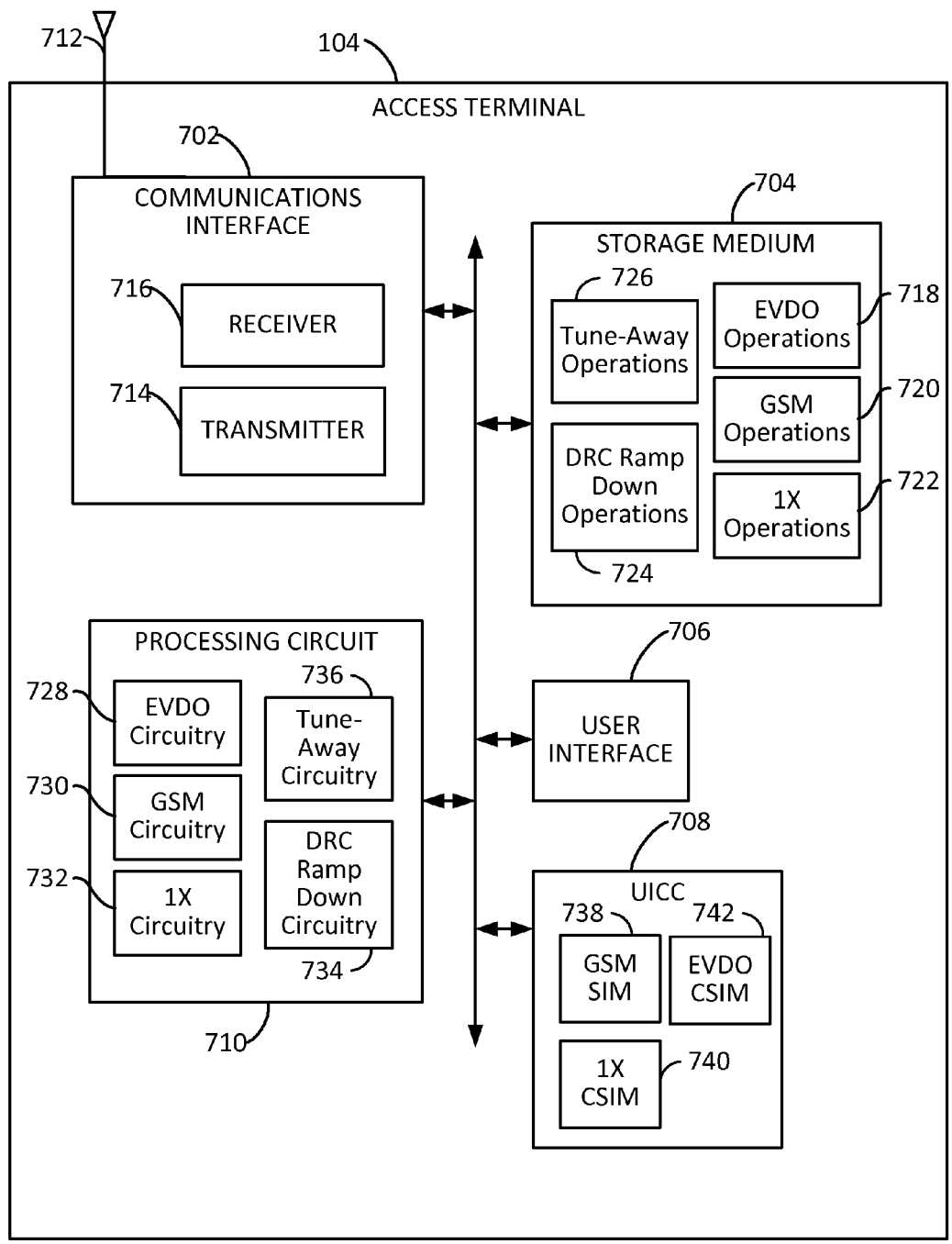
FIG. 7 is a block diagram illustrating select components of an access terminal according to at least one example.

FIG. 7 is a block diagram illustrating select components of an access terminal 104 according to at least one aspect of the present disclosure. The access terminal 104 includes a communications interface or transceiver 702, a storage medium 704, a user interface 706, and an identity circuitry (e.g., a universal integrated circuit card or UICC) 708. These components can be coupled to and/or placed in electrical communications with a processing circuit 710.

The communications interface 702 may be adapted to facilitate wireless communications of the access terminal 104. For example, the communications interface 702 may include circuitry and/or programming adapted to facilitate the communication of information bi-directionally with respect to one or more communications devices in a network. The communications interface 702 may be coupled to one or more antennas 712 for wireless communications within a wireless communications system. The communications interface 702 can be configured with one or more standalone receivers and/or transmitters, as well as one or more transceivers. In the illustrated example, the communications interface 702 includes a transmitter 714 and a receiver 716.

The storage medium 704 may represent one or more computer-readable, machine-readable, and/or processor-readable devices for storing programming, such as processor executable code or instructions (e.g., software, firmware), electronic data, databases, or other digital information. The storage medium 704 may also be used for storing data that is manipulated by the processing circuit 708 when executing programming. The storage medium 704 may be any available media that can be accessed by a general purpose or special purpose processor, including portable or fixed storage devices, optical storage devices, and various other mediums capable of storing, containing or carrying programming. By way of example and not limitation, the storage medium 704 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 704 may be coupled to the processing circuit 710 such that the processing circuit 710 can read information from, and write information to, the storage medium 704. That is, the storage medium 704 can be coupled to the processing circuit 710 so that the storage medium 704 is at least accessible by the processing circuit 710, including examples where at least one storage medium is integral to the processing circuit 710 and/or examples where at least one storage medium is separate from the processing circuit 710 (e.g., resident in the access terminal 104, external to the access terminal 104, distributed across multiple entities).

Programming stored by the storage medium 704, when executed by the processing circuit 710, causes the processing circuit 710 to perform one or more of the various functions and/or process steps described herein. For example, the storage medium 704 may include EVDO operations 718, GSM operations 720, and IS-2000 1X operations 722, each configured for regulating operations at one or more hardware blocks of the processing circuit 710, as well as to utilize the communications interface 702 for wireless communication utilizing their respective communication protocols. For example, each of the respective operations blocks 718, 720, and 722 may be configured for receiving, processing, and responding to paging messages, and undertaking traffic calls utilizing their respective protocols.

In a further aspect of the disclosure, the storage medium 704 may include tune-away operations 726 configured to manage tuning of the communications interface 702 from any one communication protocol or subscription to another communication protocol or subscription, as well as managing timing of such tune-away operations. The storage medium 704 may further include DRC ramp down operations 724 configured to manage the transmission of the DRC channel utilizing a null cover for a number (e.g., a predetermined number) of time slots to inhibit transmission of EVDO traffic from the corresponding access network.

The processing circuit 710 is generally adapted for processing, including the execution of such programming stored on the storage medium 704. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 710 is arranged to obtain, process and/or send data, control data access and storage, issue commands, and control other desired operations. The processing circuit 710 may include circuitry configured to implement desired programming provided by appropriate media in at least one example. For example, the processing circuit 710 may be implemented as one or more processors, one or more controllers, and/or other structure configured to execute executable programming. Examples of the processing circuit 710 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 710 are for illustration and other suitable configurations within the scope of the present disclosure are also contemplated.

According to one or more aspects of the present disclosure, the processing circuit 710 may be adapted to perform any or all of the features, processes, functions, steps and/or routines for any or all of the access terminals 104 described herein. As used herein, the term "adapted" in relation to the processing circuit 710 may refer to the processing circuit 710 being one or more of configured, employed, implemented, and/or programmed to perform a particular process, function, step and/or routine according to various features described herein.

According to at least one example of the access terminal 104, the processing circuit 710 may include EVDO circuitry 728, GSM circuitry 730, and IS-2000 1X circuitry 732, each configured to utilize the communications interface 702 for wireless communication utilizing their respective communication protocols. For example, each of the respective circuitry blocks 728, 730, and 732 may be configured for receiving, processing, and responding to paging messages, and undertaking traffic calls utilizing their respective protocols.

In a further aspect of the disclosure, the processing circuit 710 may include tune-away circuitry 736 configured to manage tuning of the communications interface 702 from any one communication protocol or subscription to another communication protocol or subscription, as well as managing timing of such tune-away circuitry. The processing circuit 710 may further include DRC ramp down circuitry 734 configured to manage the transmission of the DRC channel utilizing a null cover for a number (e.g., a predetermined number) of time slots to inhibit transmission of EVDO traffic from the corresponding access network.

The identity circuitry or UICC 708 may include a plurality of SIM circuits or applications, including, for example, a GSM SIM 738, an IS-2000 1X CSIM 740, and an EVDO CSIM 742. Each of these respective SIM circuits or applications may be configured to identify the access terminal 104 and/or its corresponding subscriber to their respective networks.

Figure 8:
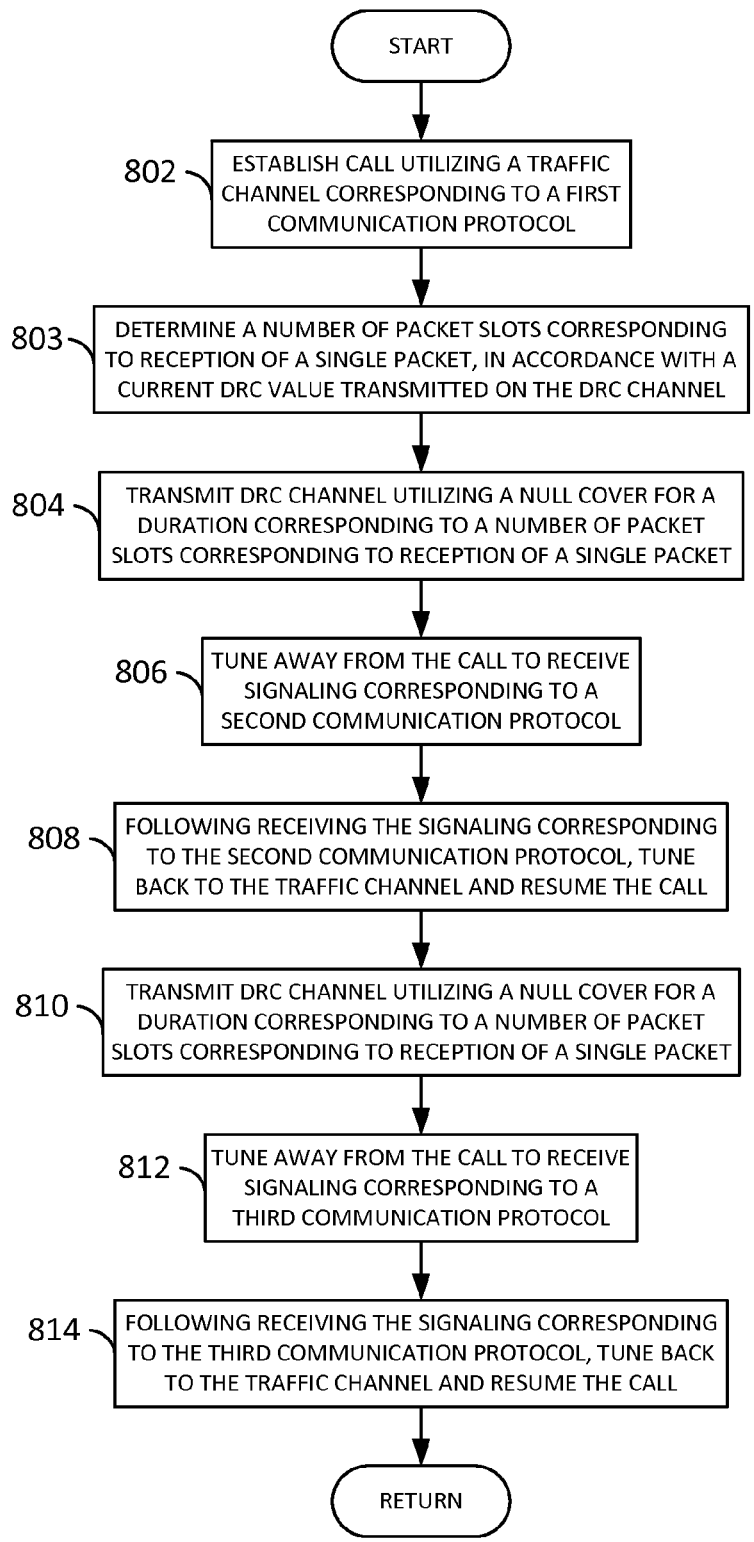
FIG. 8 is a flowchart illustrating a method of wireless communication between a mobile device and a telecommunications network in accordance with some aspects of the disclosure.

FIG. 8 is a flow chart illustrating an exemplary process 800 in accordance with an aspect of the present disclosure. In some examples, the process 800 may be implemented by the access terminal 104. In another example, the process 800 may be implemented by any suitable apparatus or means for performing the functions described herein below.

At step 802, the access terminal 104 may establish a call utilizing a traffic channel corresponding to a first communication protocol. For example, the first communication protocol may be EVDO. Here, because the access terminal 104 has a priori knowledge of the time of the scheduled tune-away operation described below at step 806, and further, because the DRC ramp-down procedure described below at step 804 is known a priori to be no greater than 16 time slots, the duration of the EVDO traffic call may be extended for a greater duration (i.e., until a closer time to the tune-away operation at step 806) than in a conventional access terminal, resulting in an increase in EVDO throughput.

At step 803, the access terminal 104 may determine a number of packet slots corresponding to reception of a single packet, in accordance with a current DRC value transmitted on the DRC channel. For example, as described above, with a DRC value of 1 (e.g., DRC-1), a single packet is received on the forward link in 16 packet slots. Similarly, with a DRC value of 12 (e.g., DRC-12), a single packet is received on the forward link in 1 packet slot.

At step 804, a data rate control (DRC) channel may be transmitted utilizing a null cover, for a duration corresponding to a number of packet slots corresponding to reception of a single packet (e.g., the value determined at step 803). As indicated above, the transmission of the DRC channel utilizing the null cover may be referred to as a DRC ramp down procedure, and is utilized to inhibit transmission of the EVDO traffic from the base station 102 that is in communication with the access terminal 104 over the EVDO channel.

At step 806, the access terminal 104 may tune away from the EVDO traffic call to receive signaling corresponding to a second communication protocol. For example, the second communication protocol may be a GSM protocol, an IS-2000 1X protocol, or essentially any other protocol that an access terminal 104 may tune away to during an EVDO traffic call.

At step 808, following the receiving of signaling corresponding to the second communication protocol as indicated above in step 806, the access terminal 104 may tune back to the traffic channel (e.g., the EVDO channel) to resume the call. That is, even in the case that the time between the scheduled signaling (e.g., the page cycle) corresponding to the second communication protocol in step 806 and the scheduled signaling (e.g., the page cycle) corresponding to the third protocol in step 812 is known to be less than a threshold time Ts, wherein insufficient time would be available to resume the EVDO traffic call when the conventional 64-time slot DRC ramp down procedure was used, in this case, due to the shorter DRC ramp down procedure, the EVDO traffic call may nevertheless be resumed. For example, unlike in a conventional system, the access terminal may resume the EVDO traffic call even when the time between the first tune-away operation in step 806 and the second tune-away operation in step 812 is less than 100 ms.

In some examples, at step 810, in preparation for a second tune-away operation, to inhibit the EVDO traffic call, the access terminal 104 may transmit the DRC channel comprising a null cover for a duration corresponding to a number of packet slots corresponding to reception of a single packet.

At step 812, the access terminal 104 may tune away from the EVDO traffic call to receive signaling corresponding to a third communication protocol. For example, the third communication protocol may be an IS-2000 protocol, a GSM protocol, or essentially any other protocol that an access terminal 104 may tune away to during an EVDO traffic call.

At step 814, following the receiving of signaling corresponding to the third communication protocol as indicated above in step 812, the access terminal 104 may tune back to the traffic channel (e.g., the EVDO channel) to resume the call.

While the above discussed aspects, arrangements, and embodiments are discussed with specific details and particularity, one or more of the components, steps, features and/or functions illustrated in FIGS. 4, 6, and/or 8 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1 and/or 7 may be configured to perform or employ one or more of the methods, features, parameters, or steps described in FIGS. 4, 6, and/or 8. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A method of wireless communication between a mobile device and a telecommunications network, comprising:
    establishing a call utilizing a traffic channel corresponding to a first communication protocol;
    transmitting a data rate control (DRC) channel comprising a null cover for a duration corresponding to a number of packet slots corresponding to reception of a single packet;
    tuning away from the call to receive signaling corresponding to a second communication protocol; and
    following the receiving of the signaling corresponding to the second communication protocol, tuning back to the traffic channel to resume the call.

2. The method of claim 1, further comprising:
    tuning away from the call to receive signaling corresponding to a third communication protocol; and following the receiving of the signaling corresponding to the third communication protocol, tuning back to the traffic channel to resume the call.

3. The method of claim 2, wherein the signaling corresponding to the second communication protocol message comprises a first page message, and wherein the signaling corresponding to the third communication protocol comprises a second page message.

4. The method of claim 3, wherein a time difference between the first page message and the second page message is less than 100 ms.

5. The method of claim 2, wherein the second communication protocol comprises one of IS-2000 1X or Global System for Mobile (GSM).

6. The method of claim 2, wherein the third communication protocol comprises one of IS-2000 1X or Global System for Mobile (GSM).

7. The method of claim 1, wherein the first communication protocol comprises Evolution-Data Optimized (EVDO).

8. The method of claim 1, wherein the duration corresponding to a number of packet slots corresponding to reception of a single packet is no greater than 16 time slots.

9. The method of claim 1, further comprising:
determining the number of packet slots corresponding to reception of a single packet in accordance with a current DRC value transmitted on the DRC channel.

10. An apparatus configured for wireless communication, comprising:
at least one processor;
a memory coupled to the at least one processor; and
a communication interface coupled to the at least one processor, wherein the at least one processor is configured to:
establish a call utilizing a traffic channel corresponding to a first communication protocol;
transmit a data rate control (DRC) channel comprising a null cover for a duration corresponding to a number of packet slots corresponding to reception of a single packet;
tune away from the call to receive signaling corresponding to a second communication protocol; and
following the receiving of the signaling corresponding to the second communication protocol, tune back to the traffic channel to resume the call.

11. The apparatus of claim 10, wherein the at least one processor is further configured to:
tune away from the call to receive signaling corresponding to a third communication protocol; and
following the receiving of the signaling corresponding to the third communication protocol, tune back to the traffic channel to resume the call.

12. The apparatus of claim 11, wherein the signaling corresponding to the second communication protocol message comprises a first page message, and wherein the signaling corresponding to the third communication protocol comprises a second page message.

13. The apparatus of claim 12, wherein a time difference between the first page message and the second page message is less than 100 ms.

14. The apparatus of claim 11, wherein the second communication protocol comprises one of IS-2000 1X or Global System for Mobile (GSM).

15. The apparatus of claim 11, wherein the third communication protocol comprises one of IS-2000 1X or Global System for Mobile (GSM).

16. The apparatus of claim 10, wherein the first communication protocol comprises Evolution-Data Optimized (EVDO).

17. The apparatus of claim 10, wherein the duration corresponding to a number of packet slots corresponding to reception of a single packet is no greater than 16 time slots.

18. The apparatus of claim 10, wherein the at least one processor is further configured to determine the number of packet slots corresponding to reception of a single packet in accordance with a current DRC value transmitted on the DRC channel.

19. An apparatus configured for wireless communication, comprising:
means for establishing a call utilizing a traffic channel corresponding to a first communication protocol;
means for transmitting a data rate control (DRC) channel comprising a null cover for a duration corresponding to a number of packet slots corresponding to reception of a single packet;
means for tuning away from the call to receive signaling corresponding to a second communication protocol; and
means for, following the receiving of the signaling corresponding to the second communication protocol, tuning back to the traffic channel to resume the call.

20. The apparatus of claim 19, further comprising:
means for tuning away from the call to receive signaling corresponding to a third communication protocol; and
means for following the receiving of the signaling corresponding to the third communication protocol, tuning back to the traffic channel to resume the call.

21. The apparatus of claim 20, wherein the signaling corresponding to the second communication protocol message comprises a first page message, and wherein the signaling corresponding to the third communication protocol comprises a second page message.

22. The apparatus of claim 21, wherein a time difference between the first page message and the second page message is less than 100 ms.

23. The apparatus of claim 20,
wherein the first communication protocol comprises Evolution-Data Optimized (EVDO);
wherein the second communication protocol comprises one of IS-2000 1X or Global System for Mobile (GSM); and
wherein the third communication protocol comprises one of IS-2000 1X or Global System for Mobile (GSM).

24. The apparatus of claim 19, wherein the duration corresponding to a number of packet slots corresponding to reception of a single packet is no greater than 16 time slots.

25. The apparatus of claim 19, further comprising:
means for determining the number of packet slots corresponding to reception of a single packet in accordance with a current DRC value transmitted on the DRC channel.

26. A non-transitory computer storage medium, containing instructions which, when executed by a computer, configure a mobile device for wireless communication with a base station, by:
establishing a call utilizing a traffic channel corresponding to a first communication protocol;
transmitting a data rate control (DRC) channel comprising a null cover for a duration corresponding to a number of packet slots corresponding to reception of a single packet;
tuning away from the call to receive signaling corresponding to a second communication protocol; and following the receiving of the signaling corresponding to the second communication protocol, tuning back to the traffic channel to resume the call.

27. The non-transitory computer storage medium of claim 26, further comprising instructions for:
tuning away from the call to receive signaling corresponding to a third communication protocol; and
following the receiving of the signaling corresponding to the third communication protocol, tuning back to the traffic channel to resume the call.

28. The non-transitory computer storage medium of claim 26, wherein the duration corresponding to a number of packet slots corresponding to reception of a single packet is no greater than 16 time slots.

29. The non-transitory computer storage medium of claim 26, further comprising instructions for determining the number of packet slots corresponding to reception of a single packet in accordance with a current DRC value transmitted on the DRC channel.

* * * * *